(No Model.)
J. HOFER & G. MARTIN.
ASH PAN.
No. 332,527. Patented Dec. 15, 1885.
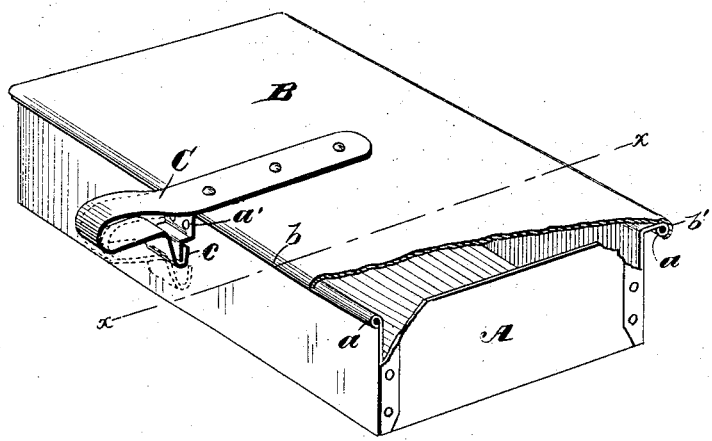
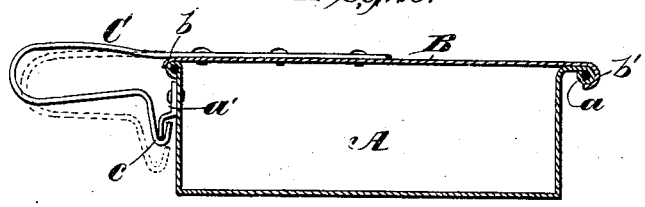
Witnesses,
Robert Everett
J. A. Rutherford
Inventors,
John Hofer
Godfrey Martin
By John W. Will
Atty.

UNITED STATES PATENT OFFICE.

JOHN HOFER AND GODFREY MARTIN, OF CINCINNATI, OHIO.

ASH-PAN.

SPECIFICATION forming part of Letters Patent No. 332,527, dated December 15, 1885.

Application filed September 24, 1884. Serial No. 143,882. (No model.)

*To all whom it may concern:*

Be it known that we, JOHN HOFER and GODFREY MARTIN, of Cincinnati, in the county of Hamilton and State of Ohio, have invented certain new and useful Improvements in Ash-Pans, of which the following is a specification.

This invention has for its object to provide an ash-pan with a handle, which serves to secure the cover of the pan in position, and also as a hand-grasp by which to lift and carry the pan.

To such ends my invention consists in an ash-pan having a catch on one side, a movable cover secured to one side of the pan by a locking projection, and a handle for the pan on the opposite side, projecting over the edge of the pan and having a hook for engaging the catch on the pan, as will be more fully hereinafter described in detail.

In the accompanying drawings illustrating my invention, Figure 1 is a perspective view of an ash-pan broken away at one end and embodying my invention, and Fig. 2 a transverse sectional view on the line $x\ x$ of Fig. 1.

The letter A indicates an ash-pan, and B the cover, preferably having flanges $b\ b'$ at its edges, engaging over the wired edge $a$ of the pan, whereby a dust-tight joint is secured. C is a handle riveted to cover B and projecting forwardly, to serve as a grip for carrying the pan, and also as a locking device to secure the lid to the pan when closed. The handle C consists of two legs, one of which, the longer leg, is riveted to the cover B, and the other, the shorter leg, is turned inwardly and downwardly, and has the hook $c$ formed on the lower end, which hook engages with the catch $a'$, riveted to the front side of pan A, and secures the cover B on the pan. The loop form of the projecting portion of handle C forms a spring, which forces the hook $c$ to engage with catch $a'$ when the cover B is placed on the pan. The rear flange, $b'$, hooks over the rear edge of pan, and secures the rear side of cover, while the hook $c$ and catch $a'$ secure the front side of cover. When the cover B is placed on the pan and locked, as described, the pan may be carried by handle C with no leakage of the contents.

Having described our invention, what we claim is—

An ash-pan having a catch on one side, a removable cover, B, secured to one side of the pan by a locking projection, and a handle, C, for the pan on the opposite side, projecting over the edge of the pan and having a hook for engaging the catch on the pan, whereby the handle serves to secure the cover and as a means for lifting and carrying the pan, substantially as described.

In testimony whereof we have signed our names to the foregoing specification in the presence of two subscribing witnesses.

JOHN HOFER.
GODFREY MARTIN.

Witnesses:
JOHN W. HILL,
C. C. ARCHER.